US012586086B2

(12) United States Patent
Reschke

(10) Patent No.: US 12,586,086 B2
(45) Date of Patent: Mar. 24, 2026

(54) PRODUCT AUTHENTICATION CODE

(71) Applicant: Dru Reschke, Penola (AU)

(72) Inventor: Dru Reschke, Penola (AU)

( * ) Notice: Subject to any disclaimer, the term of this patent is extended or adjusted under 35 U.S.C. 154(b) by 220 days.

(21) Appl. No.: 18/324,292

(22) Filed: May 26, 2023

(65) Prior Publication Data

US 2024/0394728 A1 Nov. 28, 2024

(51) Int. Cl.
*G06Q 30/018* (2023.01)
*G06V 30/224* (2022.01)

(52) U.S. Cl.
CPC ....... *G06Q 30/0185* (2013.01); *G06V 30/224* (2022.01)

(58) Field of Classification Search
CPC .......................... G06Q 30/0185; G06V 30/224
See application file for complete search history.

(56) References Cited

U.S. PATENT DOCUMENTS

| | | | |
|---|---|---|---|
| 8,712,163 B1 | 4/2014 | Osheroff | |
| 2011/0213700 A1 | 9/2011 | Sant'Anselmo | |
| 2014/0263652 A1* | 9/2014 | Auger .................. | G06K 7/1491 235/462.12 |
| 2015/0186764 A1* | 7/2015 | Allott ................... | B42D 25/305 235/494 |
| 2015/0248603 A1* | 9/2015 | Lowenthal ........... | G06K 19/086 235/491 |
| 2015/0302421 A1 | 10/2015 | Caton | |

| | | | |
|---|---|---|---|
| 2017/0300854 A1 | 10/2017 | Harcar | |
| 2018/0107915 A1* | 4/2018 | Toedtli ............. | G06K 19/06028 |
| 2019/0244068 A1 | 8/2019 | Mai et al. | |
| 2019/0311169 A1 | 10/2019 | Xu et al. | |
| 2020/0082139 A1 | 3/2020 | Peeters | |
| 2020/0226899 A1 | 7/2020 | Grunwald | |
| 2021/0039420 A1* | 2/2021 | Costa ................... | B42D 25/324 |
| 2023/0134627 A1* | 5/2023 | Harper ................ | G06K 7/1443 382/317 |
| 2023/0402485 A1* | 12/2023 | Borremans ........... | H10F 39/182 |

FOREIGN PATENT DOCUMENTS

| | | |
|---|---|---|
| JP | 2000231556 | 8/2000 |
| JP | 2000231556 A | 8/2000 |

OTHER PUBLICATIONS

CN106127279A—A new two-dimensional code, the generating method and two-dimension code label, 26 pages. (Year: 2025).*
Xu, M. et al., "Stylize Aesthetic QR Code", arXiv preprint website, published Aug. 11, 2018 <URL: https://arxiv.org/pdf/1803.01146. pdf>.

\* cited by examiner

*Primary Examiner* — Tuyen K Vo
(74) *Attorney, Agent, or Firm* — Sand, Sebolt & Wernow Co., LPA

(57) ABSTRACT

A code attached to a product for validating the authenticity of the product comprising a grid of selectively placed dots to encode a unique serial number for identifying the product. Adjacent vertical dots are joined together to form lines with rounded ends, to allow for human comparison of codes. The dots and rounded lines allow the code to be machine read even when scratched or marked.

12 Claims, 10 Drawing Sheets

105a
105b
104c
102a

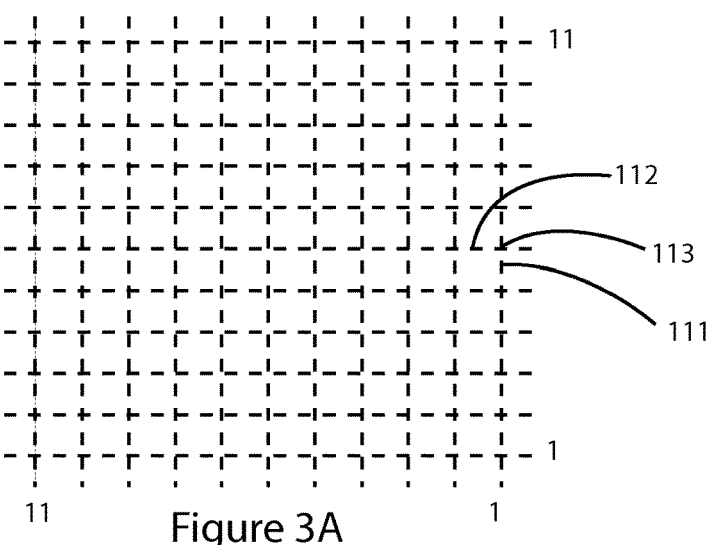
Figure 3A
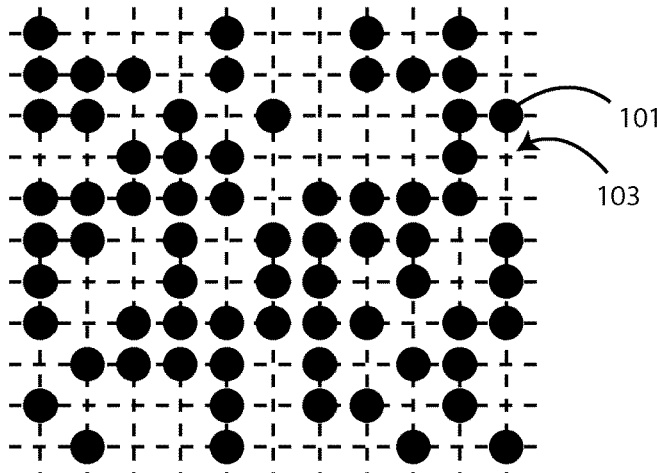
Figure 3B
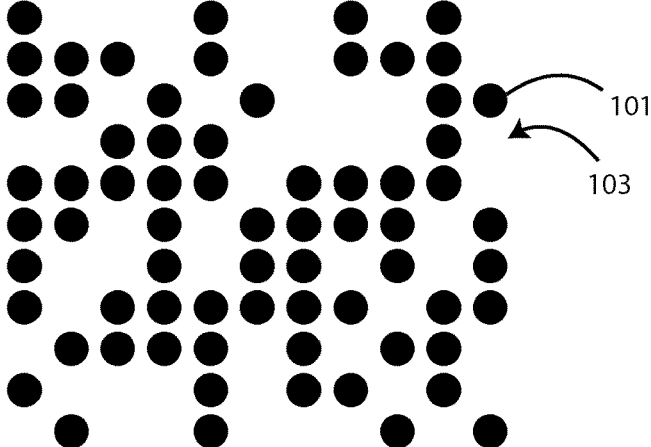
Figure 3C

100a

100b

100c

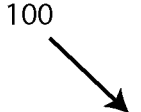
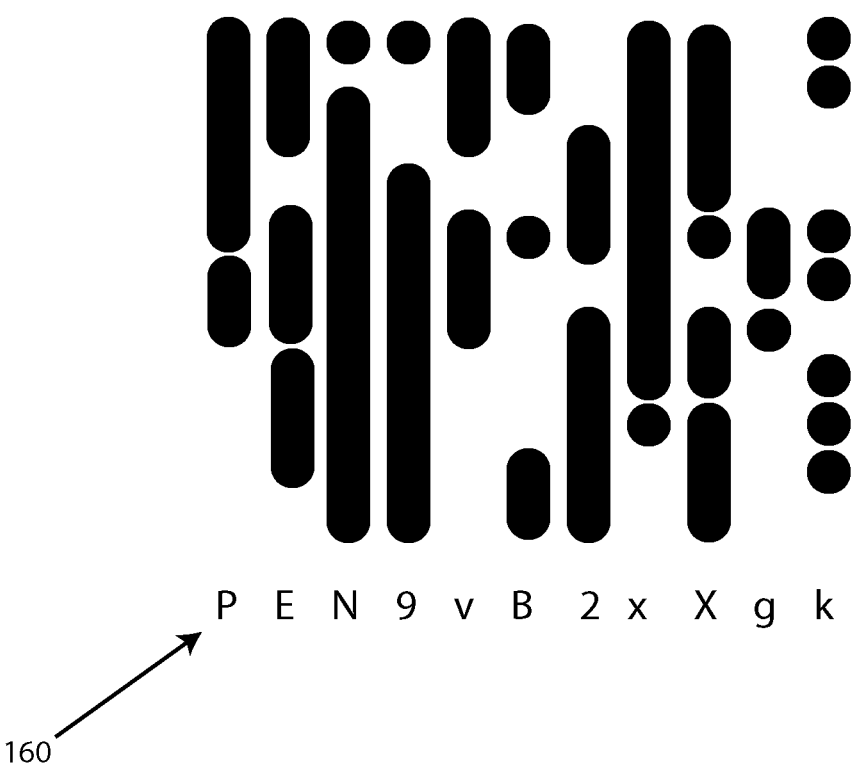
Figure 6

100
150
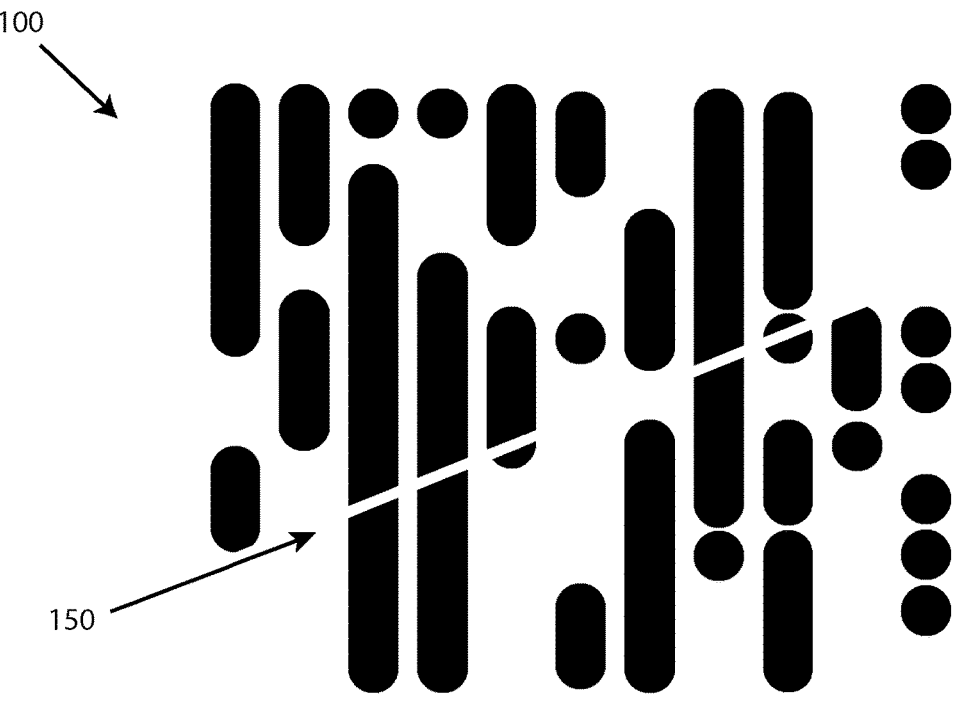
Figure 7A
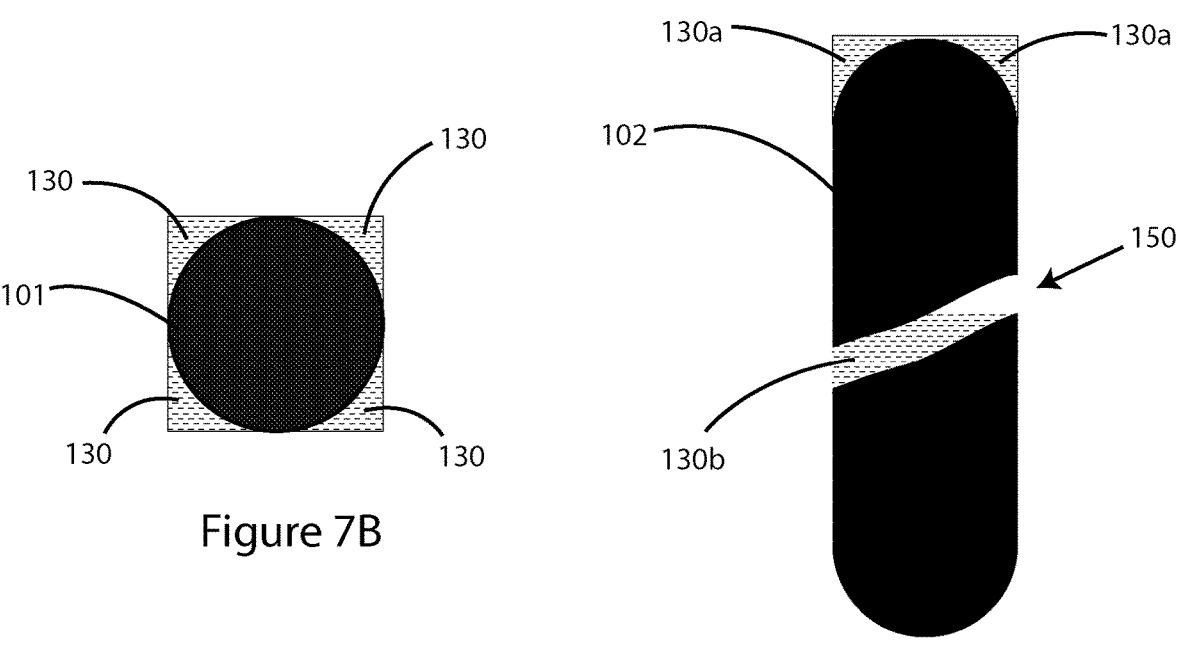
Figure 7B
Figure 7C

```
Object Metadata = {};

PrevHash = 0;
Difficuly = 2^250;
COLS = 11;
ROWS = 11;

Metadata.GeoLocation = Producer.Latitude() + Producer.Longitude();
Metadata.ManufacturerPubKey = ManufacturerPubKey;
Metadata.ProductName = ProductName;
Metadata.ProductDetails = ProductDetails;
Metadata.ProductSKU = ProductSKU;
Metadata.ManufacturerName = ManufacturerName; Metadata.ManufacturerDetails =
ManufacturerDetails;

i = 0;

While (i < 1000000 ) {

BarcodeBinary = Random(COLS,ROWS);
        Metadata.Timestamp = Time.Now();
        BarcodeInput = Metadata.ToJSONString() + PrevHash + BarcodeBinary;
        BarcodeHash = SHA256( BarcodeInput );

If ( BarcodeHash < Difficulty ) {

Signature = ECSDASign( BarcodeHash, ManufacturerPrivateKey );
                Values = [ BarcodeBinary, Metadata.ToJSONString(), BarcodeHash, Signature ];
                Database.Append( Values );
                Return;

} Else {
                i++;
        }

```
Function Random(NumCols,NumRows) {

Binary = [];
        Bit = 0;

For (col=0; col<NumCols; col++){

Binary[Bit+=2] = RandomBit();
                For (row=0; row<NumRows; row+=2){

Binary[Bit] = RandomBit();
                        if ((BinaryBit[Bit] == 1) && (BinaryBit[Bit] == BinaryBit[Bit-2])){

Binary[Bit-1] = RandomBit();

} else {

Binary[Bit-1] = 0;

}

}

}
        Return Binary;

PRODUCT AUTHENTICATION CODE

TECHNICAL FIELD

The present invention relates to a product identification code, in particular a code and associated system and method to enable the identification and tracking of individual product items to prevent product fraud.

BACKGROUND ART

User products have long had identification codes such as barcodes or more recently QR codes to provide a machine-readable identification number which can be used to access a database to provide product details such as product type, size, manufacturer, etcetera. Barcodes and QR codes have typically only provided identification at a product level, not individual items of a product. Whilst facilitating inventory management and store check-out operations such codes are easily copied and thus ineffective in controlling product fraud.

Advances have been made in QR codes to add individual item identification; effectively a serial number for each item of a product. The serial numbers can be used to access a database with can provide further details about the individual items such as manufacturing date, what wholesalers and retailers the items have been distributed through and even where and when the items have been scanned. This allows for either algorithmic or user determination of a fraud. If a box of washing detergent has been scanned multiple times in multiple different locations it would most likely be fraudulent and the QR code has been copied multiple times.

To prevent the copying of QR codes several variations are known such as using special ink or paper for printing, or including an image that degrades during the copying process. These often prove cost prohibitive.

QR codes also suffer from being easy to produce, facilitating spoofing where the scanning of a fake QR code leads a user to a fake website that reassures the user that the product is genuine.

To overcome spoofing, many formats of proprietary code formats have been developed. To thwart copying or the production of bogus codes, such proprietary codes include multiple schemes such as micro-features. Whilst such codes are effective in controlled situations, they often fall down when damaged, distorted due to printing artefacts or being placed on non-flat surfaces such as the neck of a wine bottle.

The complexity and subtle patent variations make many proprietary codes solely machine readable. This prevents users from being able to determine the bona fides of a code without the relevant code reading software. A simple test to have some confidence in the uniqueness of an individual item is to visually compare the codes of like products, e.g. comparing the codes of two wine bottles next to each other on a shop shelf. If both bottles are genuine then they would have different codes. This is difficult if not possible for a user to do for a simple code such as a barcode, let alone a QR code or a proprietary code with micro-features.

The object of this invention is to provide a product authentication code to overcome the above problems, or at least provide the public with a useful alternative.

SUMMARY OF THE INVENTION

In a first aspect the invention provides an authentication code attached to a product for validating the authenticity of the product, the code comprising a grid of primary data points with dots selectively placed on the grid to encode a unique serial number for identifying the product. Adjacent vertical dots are selectively joined together to form lines with rounded ends.

The dots may be joined together, all the time, randomly, or to reflect data within the serial number.

Preferably the joins between dots are the same width as the dots.

The grid may comprise columns wherein the width of the dots and lines in a column increases from the centre of the grid to the sides of the grid. The separation of the columns may also increase from the centre of the grid to the sides of the grid.

The code may further comprise an alphanumeric string adjacent to the grid that provides an alias for the serial number.

The code may be printed on a label attached to the product, or printed directly on the product.

It should be noted that any one of the aspects mentioned above may include any of the features of any of the other aspects mentioned above and may include any of the features of any of the embodiments described below as appropriate.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

FIGS. 3A to 3C show the preliminary steps in forming a code.

FIG. 6 shows a code with a supplementary alphanumeric code.

FIG. 7A shows a code with a scratch; FIGS. 7B and 7C show features of the code that enable scratches to be ignored when reading a code.

FIG. 8A shows a code for use on a curved surface, and FIG. 8B shows the code attached to a curved surface.

FIG. 9 shows pseudocode used by the server to for generating and storing individual item data.

FIG. 10 shows pseudocode used by the server to generate the binary serial numbers for a code.

DETAILED DESCRIPTION

Figure 1:
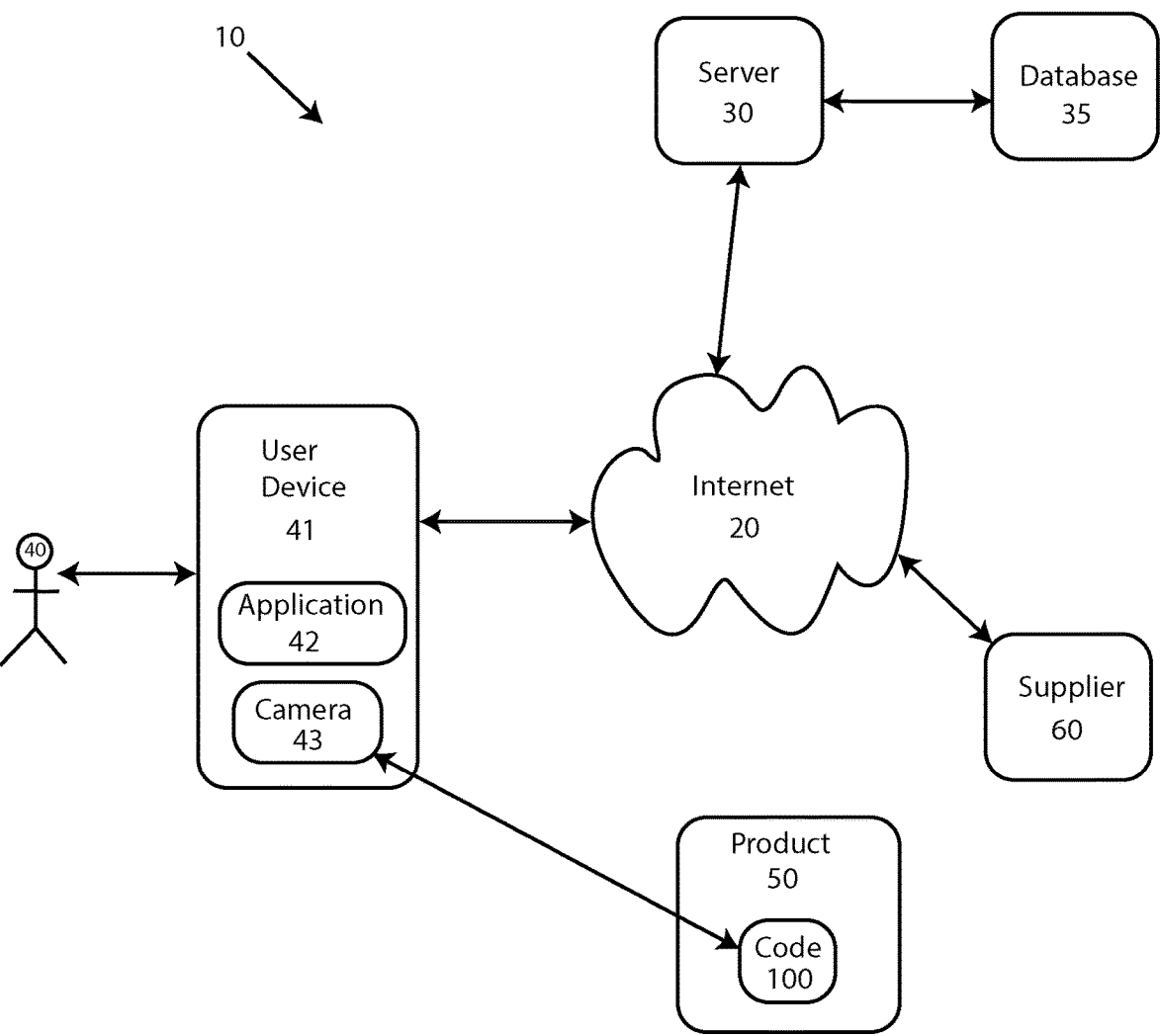
FIG. 1 shows a product authentication code system according to a preferred embodiment of the invention.

The following detailed description of the invention refers to the accompanying drawings. Wherever possible, the same reference numbers will be used throughout the drawings and the following description to refer to the same and like parts. Dimensions of certain parts shown in the drawings may have been modified and/or exaggerated for the purposes of clarity or illustration.

The present invention provides a product authentication code, hereinafter referred to as a code, and associated methods and system to facilitate individual item identification to allow for product tracking and prevent product fraud. The codes represent a serial number that acts as a unique identifier for an item. The codes are presented as an array of data points populated by either dots or voids to represent the binary digits of the serial number. The codes may be printed on a tag, sticker or label and attached to an item, printed on the item directly, or presented on a screen of a computing device. Where vertically adjacent data points are both dots, they may be joined together to form a vertical line with rounded ends from the dots. The rounded dots and line ends make the codes durable, allowing them to be read when scratched, marked, or distorted. The joins allow for further data encoding and enhance the physical representation of the codes, and also allow individual codes to be easily distinguished by users.

FIG. 1 shows a product authentication system 10 incorporating the use of a code 100 on an individual product item 50. The system 10 is deployed over the internet 20 in a typical client server configuration. The server 30 provides the management functions of the system, including generating serial numbers for producing codes, storing the serial numbers with product information in database 35, and interacting with users 40 via an application 42 on a user device 50, typically a smartphone. Suppliers 60 can also access the system, typically over the internet by any suitable device to provide product information, procure serial numbers or codes for use on their products and receive reports such as where and when products have had their codes scanned and if product fraud has been suspected. When wishing to gain information about a product or assess its authenticity, the user uses the application to scan the code with the camera 43. The application extracts the serial number from the code image with standard image processing techniques, such as those supplied by the OpenCV library, and sends it to the server. The server uses the serial number to extract the associated product information from the database and returns it to the application for presentation to the user. The information may be the scan history of the product, i.e. when and where it has been previously scanned; an assessment of the authenticity of the product; a description of the product; a description of the product; or even further information such as product instructions or a link to the manufacturer's website. Most importantly the user can easily ascertain if the product is genuine or not and make an informed decision about purchasing.

Figure 2:
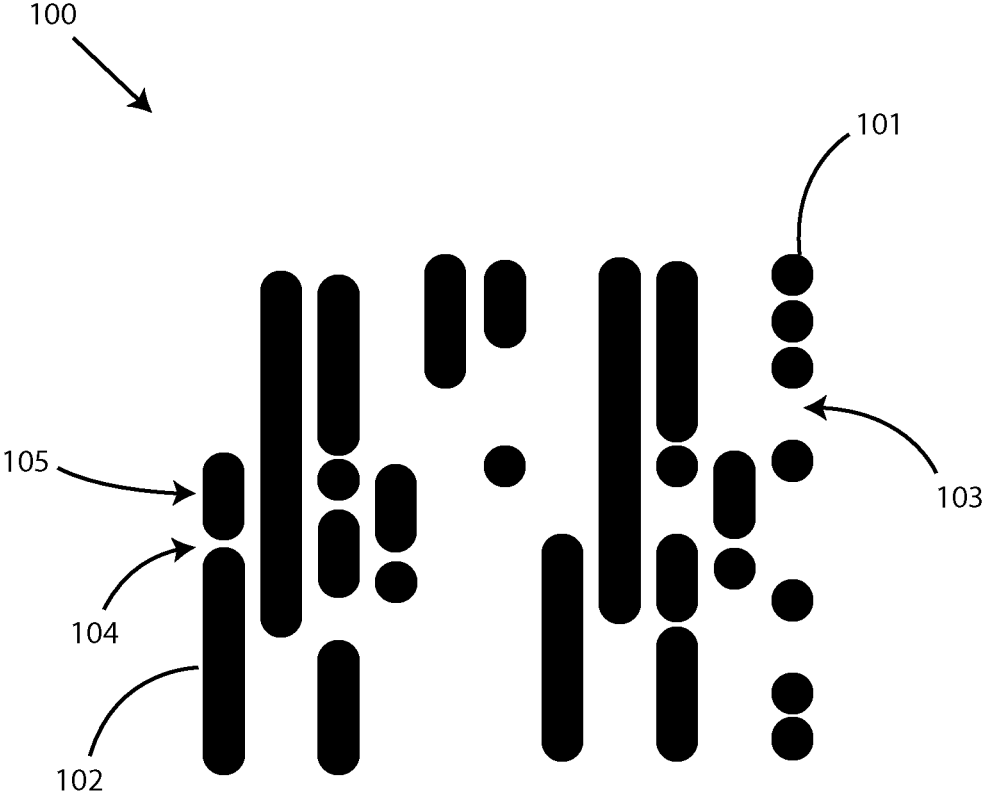
FIG. 2 shows a product authentication code (code) according to a preferred embodiment of the system.

FIG. 2 shows an example of a code 100 which includes dots 101, lines 102, voids 103 between non-adjacent dots and/or lines (i.e. spaces larger than the dots), and gaps 104 (i.e. spaces smaller than the dots) between adjacent dots and/or lines. The dots, lines, voids and gaps represent the unique serial number of the code. The lines are effectively vertically adjacent dots joined together with joins 105 which are the shape of the gaps between the dots and with a width the same as the diameter of the dots.

FIGS. 3A to 3C show the preliminary steps in forming a code. The basis of the code is a primary grid 110 as seen in FIG. 3A with 11 columns 111 and 11 rows 112 with intersections 113 which act as primary data points. In FIG. 3B a series of dots 101 have been placed on a subset of the data points 113 to encode the binary digits of a serial number. Sequencing through the data points from right to left and bottom to top and the binary digits of the serial number from least significant bit to moist significant bit, a dot is placed if the digit is a "1" and a void left if the digit is a "0". For a 11×11 grid there are 121 data points which can encode a 121-bit binary number. This can produce $2 \times 10^{36}$ unique codes and corresponding serial numbers, which would allow an individual code for every grain of sand on Earth. Whilst an 11×11 grid has been used, other size grids may be used which would produce different numbers of combinations. Instead of a binary "1" the dots could represent a binary "0". The grid may also be traversed in a different order for placing the dots, left to right, or top to bottom. FIG. 3C shows the dots without the grid. Whilst the pattern of dots is easily machine readable, it is not very user friendly as the user would not be able to easily distinguish between dot patterns even when presented side by side.

Figure 4A:
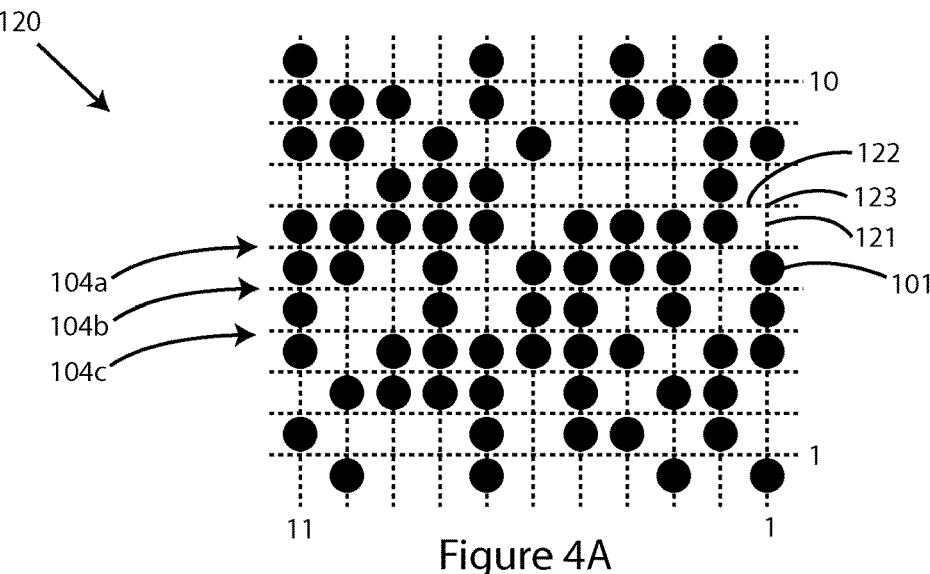
FIGS. 4A to 4C show further steps in forming a code with dots and lines with and without out breaks.
Figure 4B:
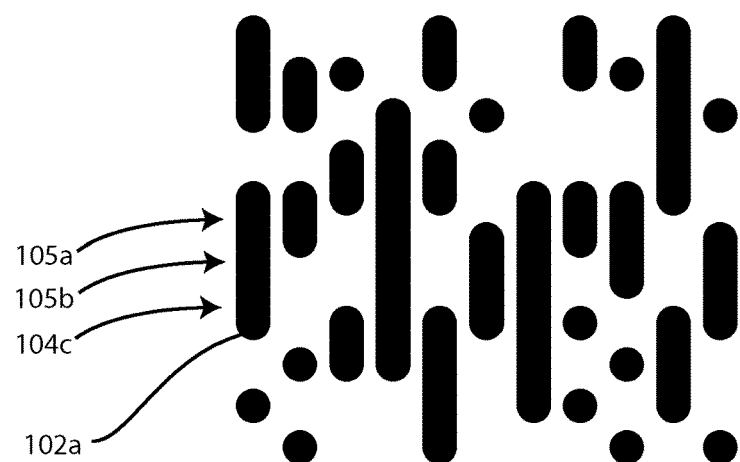
Figure 4C:
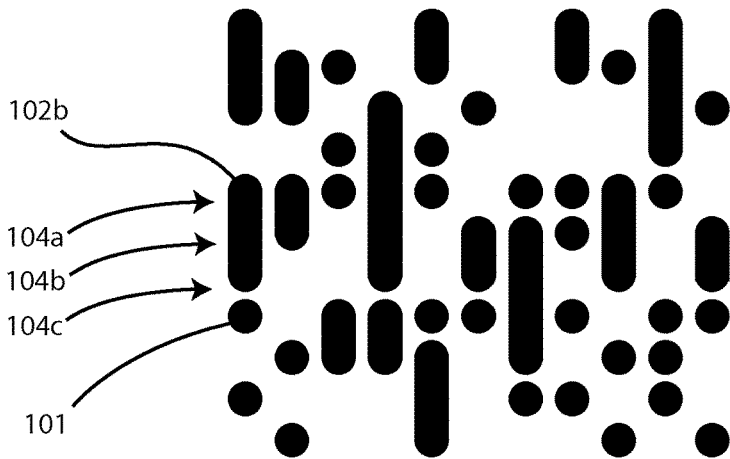

FIGS. 4A to 4C show further steps in forming a code which makes the code aesthetically pleasing by joining vertically adjacent dots to form lines, thus allowing individual codes to be readily distinguished by a user. FIG. 4A shows the same dot pattern as FIG. 3C with a secondary grid 120. The secondary grid 120 has 11 columns 121 which are coincident with the columns 111 of the primary grid and pass through the centre of the dots 101, and 10 rows 122 which are centred between the dots. The intersections 123 of the columns 121 and rows 122 act as secondary data points which can be populated with joins 105 to join vertically adjacent dots together to form vertical lines 102. Several different schemes can be used to determine if a fill is placed between adjacent dots. In a first scheme shown in FIG. 4B the same dot pattern as FIG. 4A is shown, with every gap 104 replaced with a join 105 to form vertical lines wherever possible, for example line 102a in which 3 gaps have been replaced with 3 joins to produce a line 4 dots long. FIG. 4C shows a second scheme in which the replacement of gaps 104 with joins 105 is data dependent. Extra binary digits in the serial number can be used to determine if a join or gap is present. The secondary grid 120 provides for 110 secondary data points allowing a 121+110=231-bit serial number to be used. As it is desirable to only place joins between dots, the binary digits corresponding to the secondary data points can only be a "1" if the adjacent binary digits corresponding to primary data points are both "1"s. This will happen in a quarter of instances, thus reducing the encoding bower of the 231-bit serial number by 2 bits to 229-bits. This would allow for $8 \times 10^{68}$ unique codes and corresponding serial numbers, which would allow an individual code for atom in the Milky Way galaxy. Preferably the binary digits for encoding the secondary data points are interspersed between the binary digits for encoding the primary data points in the serial number in the same order that the combined data points would be encountered when traversing the combined primary and secondary grids to ease generation of the binary serial number. A further scheme to determine if a fill is placed between adjacent dots could be a random decision not based on the serial number. This would produce a code similar to that shown in FIG. 4C. The random decision could be biased towards preferably producing more joins or more gaps.

Figure 5A:
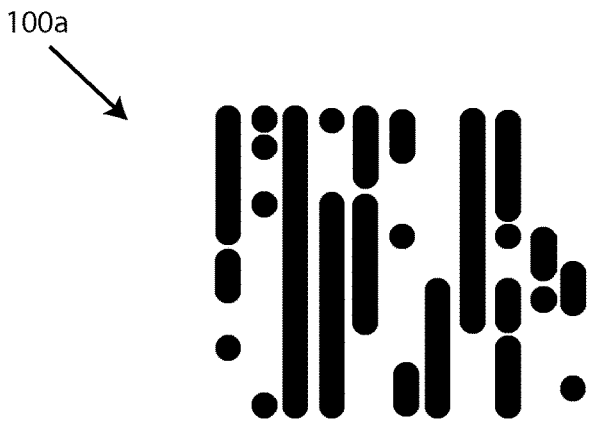
FIG. 5A to 5C show further examples of codes.
Figure 5B:
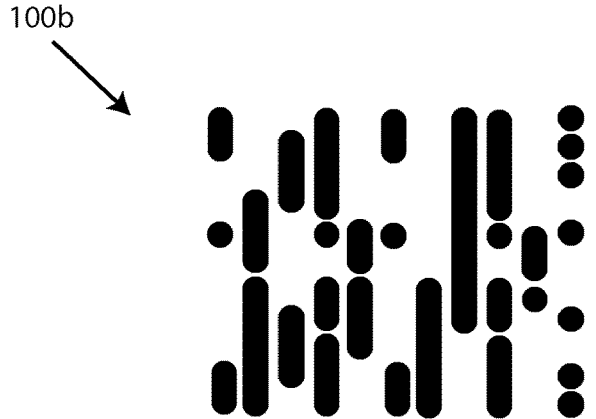
Figure 5C:
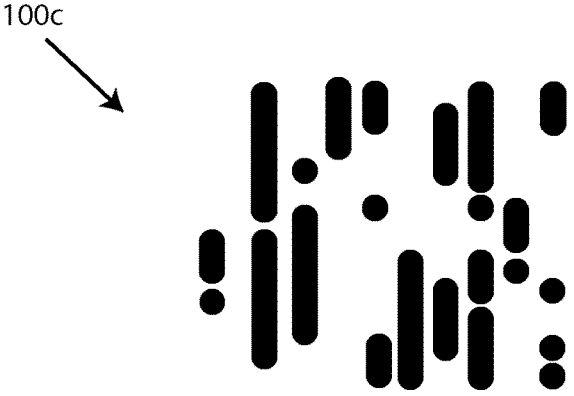

FIG. 5A to 5C show further examples of codes where the presence of joins or gaps is data dependent.

An optional feature of the codes 100 is a supplementary alphanumeric code 160 as shown in FIG. 6 which provides an alias for the serial number of the code. Each character of the alphanumeric code can be upper case, lower case, or a digit, giving 62 options. This corresponds to approximately 6 bits. For the example shown, 11 characters would provide for approximately 66 bits of encoding. The alphanumeric code is produced randomly, and each code is linked in the server database to a separate serial number to provide a secondary key for accessing the data associated with a code. This can be used as a checking mechanism for the user and can be typed into the scanning application 42 which will then provide an image of what the corresponding code should look like, and data associated with it such as product name, description and scanning history. Optionally, some of the characters may be assigned to represent a particular manufacturer. Using three characters provides for $62^3$ or 238,000 manufacturers, whilst still providing 8 characters, or $62^8$ or 238 billion codes for individual items produced by the manufacturer. The example shown has the first three characters as "PEN" to represent the manufacturer.

As well as providing an aesthetically pleasing code, the use of dots and lines with rounded ends allows for more reliable scanning of codes that are scratched or marked. FIG. 7A shows an example of a code 100 code with a scratch 150 that can still be read by the system. FIG. 7B shows a close up of a dot 101 with surrounding areas 130 that are analysed by the image processing software of the application to look for appropriately rounded edges, to indicate the end of a line or dot. FIG. 7C shows a close up of a line 102 with a scratch 150. The rounded geometry in the regions 130*a* allow the end of a line to be detected, similarly the lack of round geometry in region 130*b* allows the scratch 150 to be ignored and the code read successfully. Similarly, marks on the codes can be ignored allowing marked codes to be read successfully.

Figures 8A, 8B:
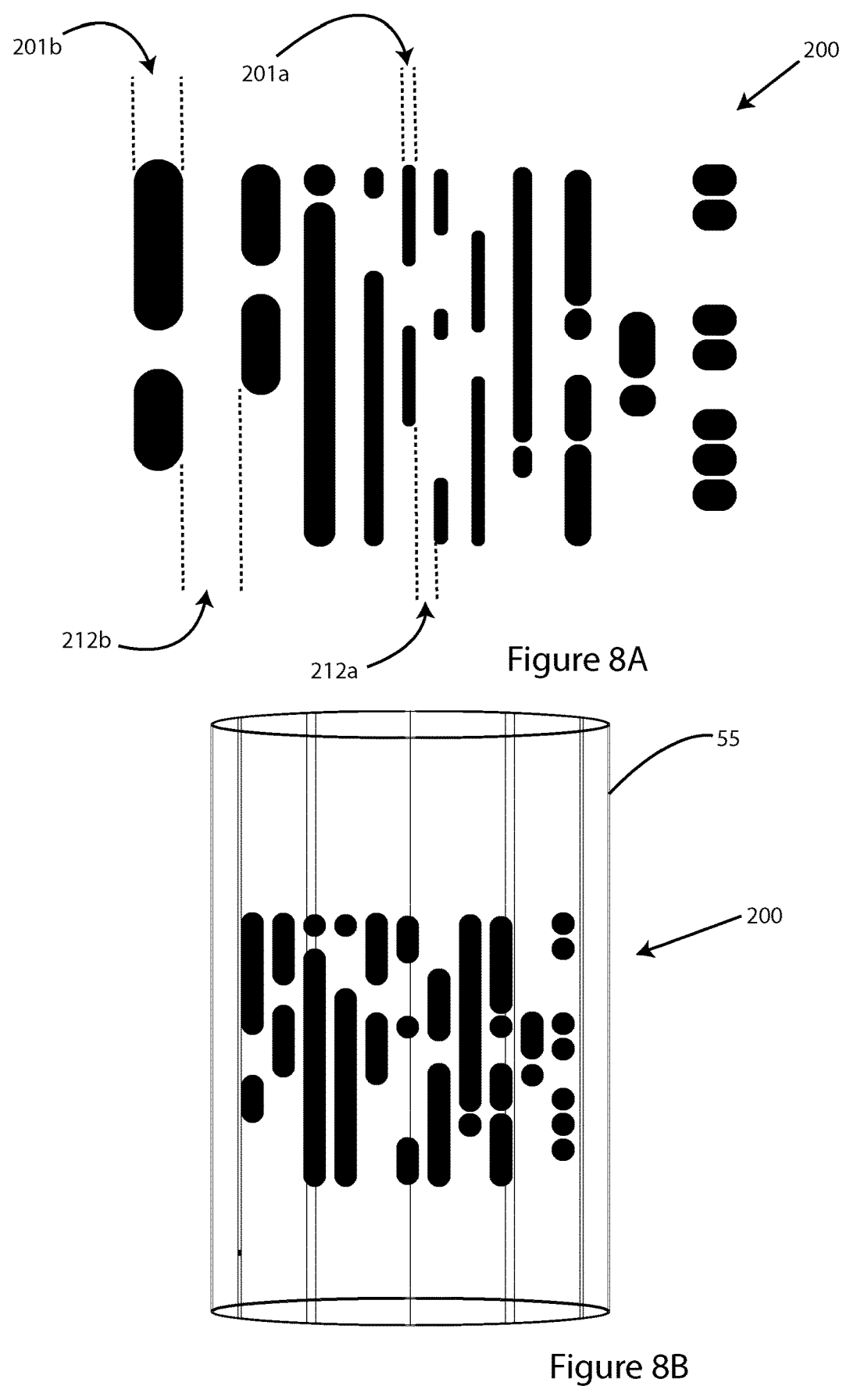

To allow for codes to operate on a highly curved surface, a code 200 as shown in FIG. 8A can be used which includes varying widths of the dots and lines and/or the spacing between the dots and lines. In this example the width of the lines and dots and their separation is at a minimum 201*a*, 212*a* at the middle of the code, and increase to a maximum of 201*b* and 212*b* at either side of the code. Simple trigonometry can be used to determine the changes in width required for a particular radius surface. An example of a code used on a highly curved surface is shown in FIG. 8B in which a code 200 is placed on the neck 55 of a wine bottle. When viewed the code is view from the centre it presents as a code with uniform widths and spacing as per any of the preceding examples and is therefore easily read by both the scanning application and the user.

Having a code 200 that can function on a highly curved surface such as the neck of a wine bottle gives increased options of where a code can be placed. For wine bottles this would allow placing a code on the main label, the neck label or even allow a code to be fitted to a bottle closure. The code could be either on the neck of the closure, the cap, or straddle both the neck and cap to also act as a tamper seal.

The following discusses how the operation of the server in a preferred embodiment of the invention in generating the binary serial numbers to use and storing them along with product and manufacturer metadata and system data. The process can be used to produce a serial number of any desired length to be encoded as a code. FIG. 9 shows pseudocode used by the server to for generating and storing individual item data and FIG. 10 shows pseudocode of a function used by the server to generate the binary serial numbers for a code.

A random binary serial number of the desired bit length is first generated as per the pseudocode of FIG. 10 which generates a number for encoding interspersed primary and secondary data points that ensures that the secondary data points are not set to a "1" unless the primary data points before and after are also set to a "1". This allows either joins or gaps to be placed between adjacent dots whilst preventing joins elsewhere.

The random binary serial number is then concatenated with the intended product and manufacturer metadata in the form of a JSON string, which includes the timestamp for when the number was generated, Geo-location of the manufacturer, the public key of the manufacturer, and optionally further data, and a previously generated SHA256. A SHA256 hash of this concatenation is then calculated, and if the hash is lower than a target difficultly (first N digits of binary are 0), the number is valid. This hash is then signed by the manufacturer's public key to certify that they requested the code generation, and approve the barcode and metadata as valid.

The binary serial number, metadata, hash and signature are recorded in the server database. An Open API enables any internet connected participant to check if a number is in fact valid and get the timestamp that it was first generated and uploaded to the server. This serial number may then be used to generate a valid code to attach to a product for authentication and resolves to display the product and manufacturer metadata of the product that was included in the number generation process.

The validity of the metadata within the hash function can then be confirmed by third parties, and the data is then immutably recorded in a time linked series of random records for the numbers. The data may not be tampered with unless the hashing work is recompleted by the server, which would invalidate all serial numbers generated after the code that is changed, creating a temper evident data source for authentication. The server may then accept incoming requests to generate new serial numbers, given that it has authenticated the producer and the product with external auditing processes.

This process ensures that for each product affixed with a code, the purchaser obtains a variety of guarantees—that the producer was known and trusted by the authentication source at the time the code was generated, that the product metadata was known and trusted by the authentication source at the time the code was generated, the exact timestamp that the random code was generated, that there is a high degree of immutability and thermodynamic work and code reprinting required to alter the metadata, timestamp or number on the server once generated, and that the manufacturer that requested the code be generated has signed all of this data with a public key that is consistent and trusted by the authentication source.

The reader will now appreciate the present invention which provides a product authentication code that can be produced cheaply, provide for individual product tracking, prevent product fraud and be easily compared by users. The use of dots and lines with rounded ends allows for resilient machine reading of the codes in the presence of scratches and marks.

Further advances and improvements may very well be made to the present invention without deviating from its scope. Although the invention has been shown and described in what is conceived to be the most practical and preferred embodiment, it is recognized that departures may be made therefrom within the scope of the invention, which is not to be limited to the details disclosed herein but is to be accorded the full scope of the claims to embrace any and all equivalent devices and apparatus. Any discussion of the prior art throughout the specification should in no way be considered as an admission that such prior art is widely known or forms part of the common general knowledge in this field.

In the present specification and claims (if any), the word "comprising" and its derivatives including "comprises" and "comprise" include each of the stated integers but does not exclude the inclusion of one or more further integers.

What is claimed:

1. An authentication code attached to a product for validating the authenticity of the product, the code comprising a grid of primary data points with adjacent data points being separated by a pitch distance and with dots selectively placed on the grid to encode a unique serial number for identifying the product, the dots being of a dot diameter which is less than the pitch distance, wherein adjacent dots in a direction are selectively joined together by joins to form lines with rounded ends.

2. The authentication code of claim 1, wherein adjacent dots in a vertical direction are selectively joined together to form lines with rounded ends.

3. The authentication code of claim 1, wherein adjacent dots in a horizontal direction are selectively joined together to form lines with rounded ends.

4. The authentication code of claim 2, wherein the joins between adjacent dots are of a width the same as the dot diameter.

5. The authentication code of claim 2, wherein the vertically adjacent dots are always joined together.

6. The authentication code of claim 2, wherein the vertically adjacent dots are joined together dependent on data within the serial number.

7. The authentication code of claim 2, wherein the vertically adjacent dots are joined together at random.

8. The authentication code of claim 2, wherein the grid comprises columns, and wherein the separation of the columns increases from the center of the grid to the sides of the grid.

9. The authentication code of claim 8, wherein the width of the dots and lines in a column increases from the centre of the grid to the sides of the grid.

10. The authentication code of claim 2, further comprising an alphanumeric string adjacent to the grid, wherein the alphanumeric string provides an alias for the serial number.

11. The authentication code of claim 2, wherein the code is printed on a label attached to the product.

12. The authentication code of claim 2, wherein the code is printed directly on the product.

\* \* \* \* \*